(12) United States Patent
Luo

(10) Patent No.: US 7,383,617 B2
(45) Date of Patent: *Jun. 10, 2008

(54) HINGE ASSEMBLY

(75) Inventor: Pu Luo, Shenzhen (CN)

(73) Assignees: Hong Fu Jin Precision Industry (ShenZhen) Co., Ltd., Shenzhen, Guangdong Province (TW); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/541,181

(22) Filed: Sep. 29, 2006

(65) Prior Publication Data

US 2007/0022569 A1   Feb. 1, 2007

Related U.S. Application Data

(63) Continuation of application No. 11/177,964, filed on Jul. 8, 2005, now Pat. No. 7,299,524.

(30) Foreign Application Priority Data

Jul. 16, 2004   (CN)   ............... 2004 2 0071822 U

(51) Int. Cl.
*E05F 1/08* (2006.01)
(52) U.S. Cl. .................................. 16/303; 16/330
(58) Field of Classification Search .......... 16/303–306, 16/329–331; 361/683, 803; 379/433.13, 379/434; 455/575.1, 575.3
See application file for complete search history.

(56) References Cited

U.S. PATENT DOCUMENTS

| 6,633,643 | B1 * | 10/2003 | Ona ............... 379/433.13 |
| 6,678,539 | B1 * | 1/2004 | Lu .................. 455/575.1 |
| 6,985,759 | B2 * | 1/2006 | Ona ............... 455/575.3 |
| 7,085,375 | B2 * | 8/2006 | Katoh ............ 379/433.13 |
| 2001/0053674 | A1 * | 12/2001 | Katoh ............... 455/90 |
| 2003/0162509 | A1 * | 8/2003 | Bae et al. .......... 455/90 |
| 2004/0237259 | A1 * | 12/2004 | Huang et al. ....... 16/330 |
| 2004/0261224 | A1 * | 12/2004 | Li et al. ............ 16/330 |

* cited by examiner

*Primary Examiner*—Katherine Mitcheli
*Assistant Examiner*—Ruth C. Rodriguez
(74) *Attorney, Agent, or Firm*—Jeffrey T. Knapp

(57) ABSTRACT

An exemplary hinge assembly includes a hollow housing (100), a shaft (300), an urging mechanism (400), a cam (500), and a follower (700). The housing includes an open end, and a hole (104) in an opposite second end. A peripheral wall of the housing at the open end defines two pinholes (112). The shaft 300 includes a fixing portion and a stopper portion (204). The urging mechanism is received in the housing and located around the shaft. The cam defines a cam hole (506) therethrough, and includes a cam portion (502) received in the housing. One end of the cam portion has a cam surface (508). The cam hole engagingly receives the shaft, so that the cam rotates with the shaft. The urging mechanism biases the cam. The follower is fixed in the pinholes. The follower rotates relative to the shaft, and is movably engaged with the cam surface.

17 Claims, 6 Drawing Sheets

US 7,383,617 B2

HINGE ASSEMBLY

CROSS-REFERENCE TO RELATED APPLICATION

This application is a continuation application of U.S. Ser. No. 11/177,964, filed Jul. 8, 2005, now U.S. Pat. No. 7,299,524, the entire contents of which are incorporated herein by reference.

BACKGROUND OF THE INVENTION

1. Field of the Invention

The present invention relates to hinge assemblies, and particularly to a hinge assembly for foldable electronic devices such as mobile telephones, electronic notebooks, and so on.

2. Discussion of the Related Art

With the development of the technologies of wireless communication and information processing, portable electronic devices such as mobile telephones and electronic notebooks are now in widespread use. These electronic devices enable consumers to enjoy the convenience of high technology services anytime and anywhere. Foldable electronic devices are particularly favored by consumers for their convenience.

Generally, foldable electronic devices have most of the electronics in one housing, called the body. The other housing, called the cover, normally contains fewer electronic components than the body. Other foldable electronic devices have all the electronics in the body, with the cover containing no electronics. Various types of hinge assemblies are used to join a body and a cover of a foldable electronic device, so that the cover can unfold up from and fold down upon the body. Manufacturers are constantly seeking to reduce the volume, size and weight of portable foldable electronic devices. Thus, it is desirable that the hinge assembly coupling the main housing with the cover is modularized and miniaturized. A modularized hinge assembly has moving parts such as a cam member, a cam follower and a spring held together in a unified structure. The structure is easily and quickly attached to the main housing and the cover during mass production. A miniaturized hinge assembly has as few parts as possible, with the parts being as small as practicable.

One kind of portable cellular foldable electronic device with a hinge assembly is described in P.R. China Patent Application No. 03100445.8 published on Jul. 30, 2003. Referring to FIG. 6, the hinge assembly includes a housing 20, a rotary member 30, a rotary shaft 40, a moving part 50, and an elastic element 60. The housing 20 has a hole in one end thereof, and an opposite open end. The rotary member 30 has a connecting portion 31 and a cam follower 32. The connecting portion 31 defines a groove 33. A connecting wall (not shown) protrudes from the bottom of the groove 33. The connecting wall includes four fan-shaped walls (not shown). The rotary shaft 40 has a first portion 41 with a larger diameter, a flange 42, a second portion 43 with a smaller diameter, and a latching portion 44. The moving part 50 includes a sidewall 51, and a cam portion 52 engaging with the cam follower 32. The elastic element 60 is received in the housing 20, and pushes the moving part 50 toward the rotary member 30. The rotary shaft 40 passes through the hole of the housing 20, the elastic element 60, the moving part 50 and the rotary member 30 in that order. Then, the rotary shaft 40 is securely connected with the rotary member 30 by the connection between the latching portion 44 and the fan-shaped walls.

Although suitable for some foldable electronic devices, the above-described hinge assembly is not suitable for certain miniaturized foldable electronic devices. This is because the housing 20 of a miniaturized foldable electronic device may not have sufficient bulk to sturdily withstand the forces generated from the elastic element 60. In addition, the structure of the rotary member 30 of the hinge assembly is complicated and the volume of the rotary member 30 is large. This means that the longitudinal size of the hinge assembly is increased, and hence the volume of the foldable electronic device is also increased. Furthermore, the structure of the rotary shaft 40 is complicated, which increases the manufacturing costs of the hinge assembly.

What is needed, therefore, is a hinge assembly which has a relatively simple and small modularized configuration, and which can be produced at low cost.

SUMMARY

An exemplary hinge assembly for joining a cover to a main body of a foldable electronic device comprises a hollow housing, a shaft, an urging mechanism, a cam, and a follower. The housing comprises a peripheral wall, an open end, and a hole in an opposite second end, with the peripheral wall of the housing defining a pair of opposite pinholes adjacent to the open end. The shaft includes a fixing portion extending out of the housing through the hole, and a stopper portion adjacent to the fixing portion. The urging mechanism is received in the housing and located around the shaft. One end of the urging mechanism abuts the stopper portion of the shaft. The cam comprises a shaft portion, a cam portion received in the housing, and a cam hole extending through the shaft portion and the cam portion. One end of the cam portion has a cam surface. The cam hole engagingly receives the shaft and rotates with the shaft, and an opposite end of the urging mechanism biases the cam. The follower is essentially in the shape of a cylinder, and is fixed in the pinholes of the housing. The follower rotates relative to the shaft, and movably engages with the cam surface.

A main advantage of the hinge assembly is that the longitudinal size of the hinge assembly is reduced. In addition, the volume and weight of the hinge assembly is reduced because of the cylindrical follower. Accordingly, the space required in an application such as a mobile phone is reduced. Furthermore, the hinge assembly is modularized, which makes it convenient for mass assembly of portable electronic devices.

Other advantages and novel features will become more apparent from the following detailed description when taken in conjunction with the accompanying drawings, in which:

DETAILED DESCRIPTION OF PREFERRED EMBODIMENTS

Figure 1:
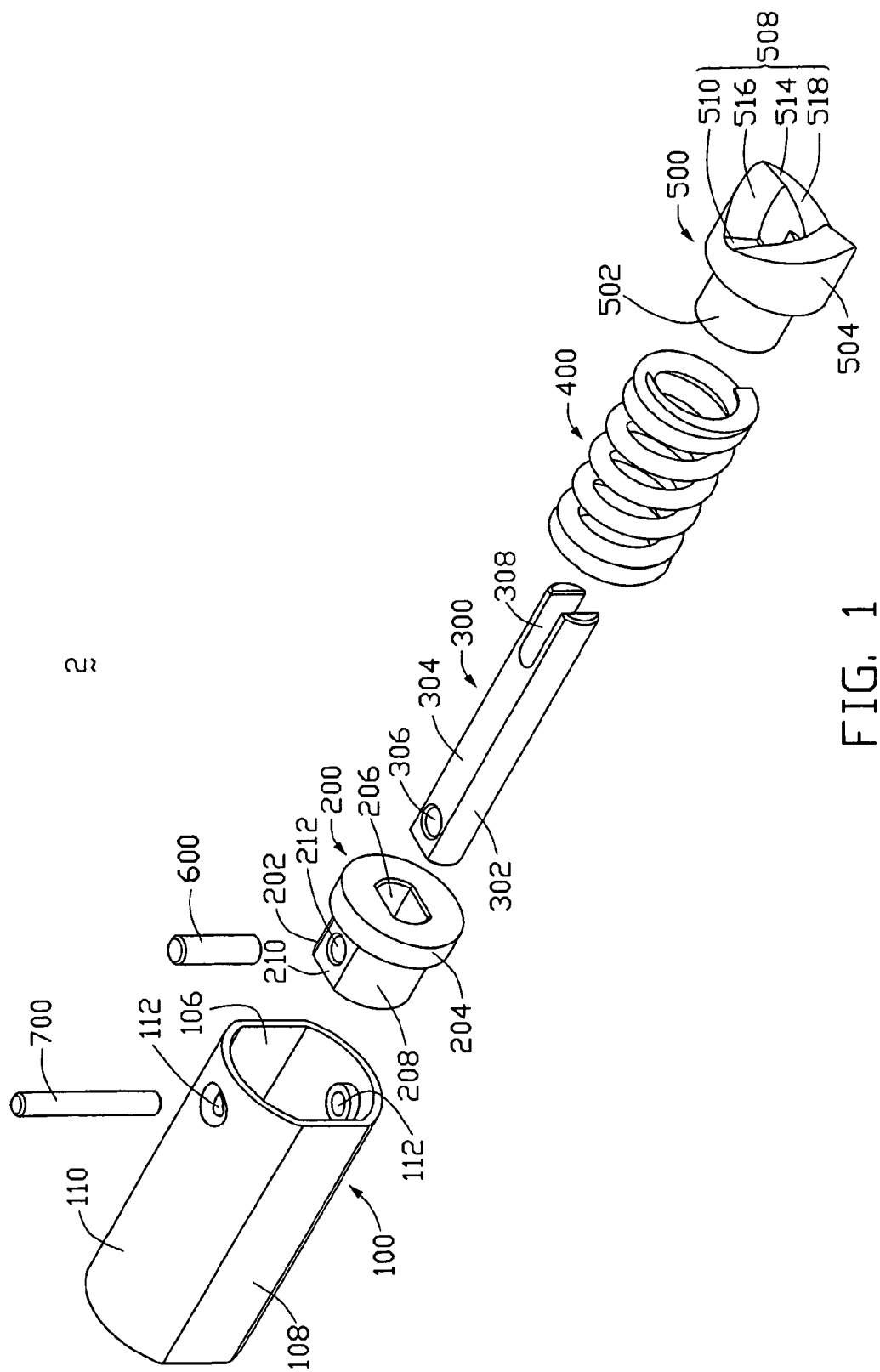
FIG. 1 is an exploded, isometric view of a hinge assembly according to a preferred embodiment of the present invention.
Figure 2:
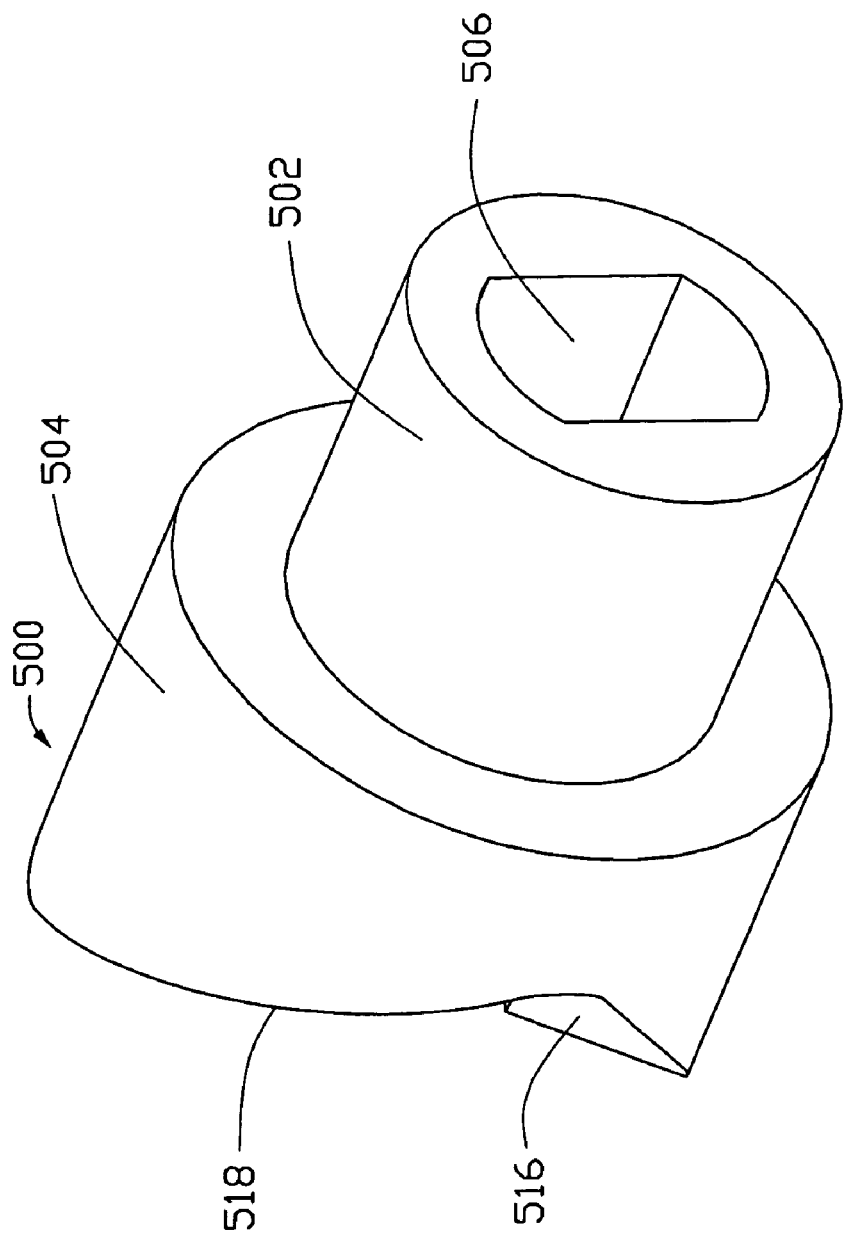
FIG. 2 is an enlarged, isometric view of a cam of the hinge assembly of FIG. 1.
Figure 3:
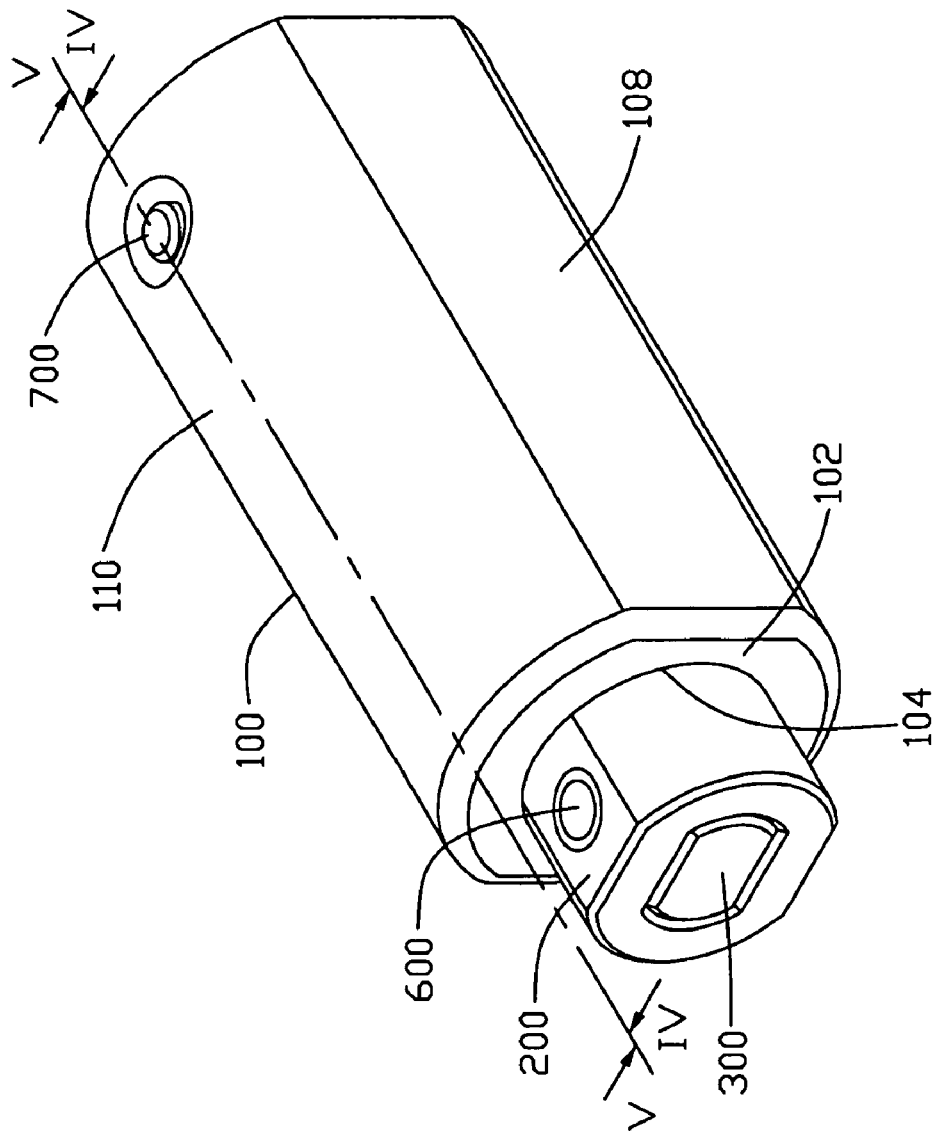
FIG. 3 is an assembled view of the hinge assembly of FIG. 1, but viewed from another aspect, and showing the hinge assembly in a first position corresponding to a closed position of a foldable electronic device.

FIG. 3 shows a hinge assembly according to a preferred embodiment of the present invention. The hinge assembly 2 is used to interconnect components like a body (not shown) and a cover (not shown) of a foldable electronic device. Also referring to FIGS. 1 and 2, the hinge assembly 2 includes a housing 100, a fixed member 200, a shaft 300, a spring 400 functioning as an elastic element, a cam 500, a pin 600, and a follower 700. The shaft 300 extends through the housing 100, the fixed member 200, the elastic element 400, the cam 500 and around the follower 700, thereby integrating the hinge assembly 2 into a complete unit.

The housing 100 is generally a hollow cylinder. The housing 100 is partly closed off at a rear end and open at a front end thereof, thus forming a rear wall 102 at the rear end and an open end (not labeled) at the front end. The rear wall 102 defines a central hole 104, for the shaft 300 and a part of the fixed member 200 to extend through. The housing 100 defines a cavity 106, and includes a pair of opposite planar sidewalls 108 and a pair of opposite arcuate sidewalls 110. The planar sidewalls 108 enable the housing 100 to be easily engaged in a corresponding socket of the cover of the foldable electronic device. A pair of opposite pinholes 112 are defined through the arcuate sidewalls 110 of the housing 100 adjacent the open end. The pinholes 112 are aligned with each other. The housing 100 is typically made of plastic material.

The fixed member 200 includes a securing portion 202, a discoid head 204 functioning as a stopper portion, and a hole 206. The securing portion 202 is integrally formed with the discoid head 204. The hole 206 is defined through the securing portion 202 and the discoid head 204. The securing portion 202 includes two opposite arcuate faces 208 and two opposite planar faces 210. The planar faces 210 of the securing portion 202 enable it to be easily engaged in a corresponding socket of the main body of the foldable electronic device. A pair of opposite pinholes 212 are defined through the planar faces 210 of the securing portion 202. The pinholes 212 are aligned with each other.

The shaft 300 is a generally cylindrical body with two opposite arcuate sides 302 and two opposite planar sides 304. A cross-sectional shape of the shaft 300 corresponds to a shape of the hole 206 of the fixed member 200. A diameter of the shaft 300 is smaller than an inner diameter of the spring 400. The shaft 300 defines a through hole 306 in one end thereof, the through hole 306 spanning between the planar sides 304. The through hole 306 has a diameter corresponding to a common diameter of the pinholes 212 of the fixed member 200. The shaft 300 defines a generally U-shaped notch 308 in an opposite end thereof, with the notch 308 spanning between the planar sides 304.

The spring 400 is metallic and helical, with an outer diameter smaller than a corresponding inner diameter of the housing 100. The spring 400 is placed around the shaft 300. One end of the spring 400 resists the discoid head 204 of the fixed member 200, and the other end of the spring 400 resists the cam 500.

The cam 500 includes a shaft portion 502, a cam portion 504, and a cam hole 506 defined through the shaft portion 502 and the cam portion 504. The shaft portion 502 is a generally cylindrical body. A diameter of the shaft portion 502 is smaller than an inner diameter of the spring 400. The cam portion 504 has a cam surface 508. The cam surface 508 includes two valleys 510, two peaks 514, two steep inclined planes 516, and two moderate inclined planes 518. Preferably, the valleys 510 are located 180 degrees from each other, and the peaks 514 are located 180 degrees from each other. The cam portion 504 has a diameter smaller than said corresponding inner diameter of the housing 100, and larger than the diameter of the shaft portion 502.

The pin 600 is cylindrical, and has a diameter corresponding to a common diameter of the pinholes 212 and the through hole 306. In the preferred embodiment, the pin 600 has a diameter slightly larger than the diameter of the pinholes 212 and through hole 306, so that the pin 600 can be inserted into and interferingly fixed with the fixed member 200 and the shaft 300.

The follower 700 is cylindrical, and functions as a positioning member. The shape and size of the follower 700 correspond to the shape and size of the pinholes 112 of the housing 100. The follower 700 is fixedly engaged in the pinholes 112 such that the follower 700 is also fixedly engaged with housing 100. Thereby, the follower 700 cannot rotate about the housing 100. The follower 700 also movably engages with the cam surface 508 of the cam portion 504 of the cam 500.

In assembly of the hinge assembly 2, firstly, the fixed member 200 is received in the cavity 106 of the housing 100 from the open end, with the securing portion 202 extending out of the rear end of the housing 100 via the central hole 104, and the discoid head 204 abutting the rear wall 102. Secondly, the shaft 300 is received in the housing 100 from the open end, and is extended through the shaft hole 206 of the fixed member 200. The through hole 306 aligns with the pinholes 212 of the fixed member 200, with one end of the shaft 300 being substantially coplanar with one end of the fixed member 200. Thirdly, the pin 600 is inserted into and securely engaged in the pinholes 212 of the fixed member 200 and the through hole 306 of the shaft 300. Preferably, the pin 600 is interferingly engaged in the pinholes 212. More preferably, the pin 600 is also interferingly engaged in the through hole 306. Fourthly, the spring 400 and the cam 500 are sequentially received in the housing 100 from the open end and placed around the shaft 300. One end of the spring 400 resists the discoid head 204 of the fixed member 200, and the other end of the spring 400 is located around the shaft portion 502 of the cam 500. The cam 500 is urged to compress the spring 400, so that the cam portion 504 is received in the housing 100. Lastly, the follower 700 is interferingly fixed in the pinholes 112, with opposite ends of the follower 700 being substantially coplanar with outer surfaces of the arcuate sidewalls 110 of the housing 100. Thus the follower 700 locks the combined shaft 300, spring 400 and cam 500 in the housing 100. When the urging of the cam 500 is released, the spring 400 urges the cam portion 504 toward the open end of the housing 100, but the cam portion 504 is blocked by the follower 700 and thus retained in the housing 100. The cam surface 508 of the cam portion 504 always contacts the follower 700 no matter what rotational position the cam portion 504 is in, because of the urging force of the spring 400. The hinge assembly 2 is thus completely assembled, as shown in FIG. 3.

Figure 5:
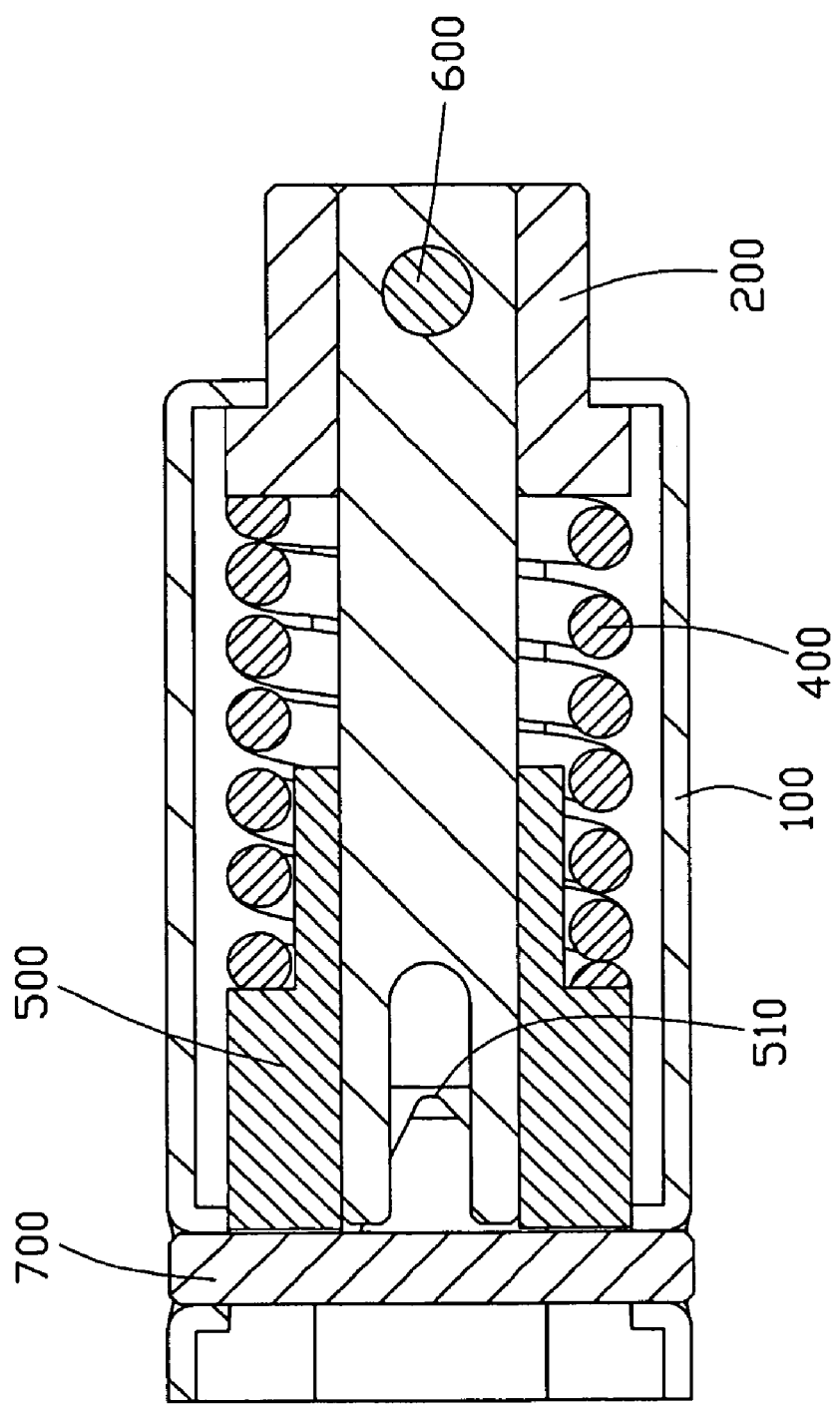
FIG. 5 is a cross-sectional view corresponding to line V-V of FIG. 3, whereby the hinge assembly is shown in a second position.

Referring to FIG. 5, in use, the housing 100 is engaged in the socket of the cover of the foldable electronic device, and the securing portion 202 of the fixed member 200 is engaged in the socket of the main body of the foldable electronic device. When the cover of the foldable electronic device is in a fully closed position, the follower 700 is located in the valleys 510 of the cam 500 and engages with the valleys 510.

Figure 4:
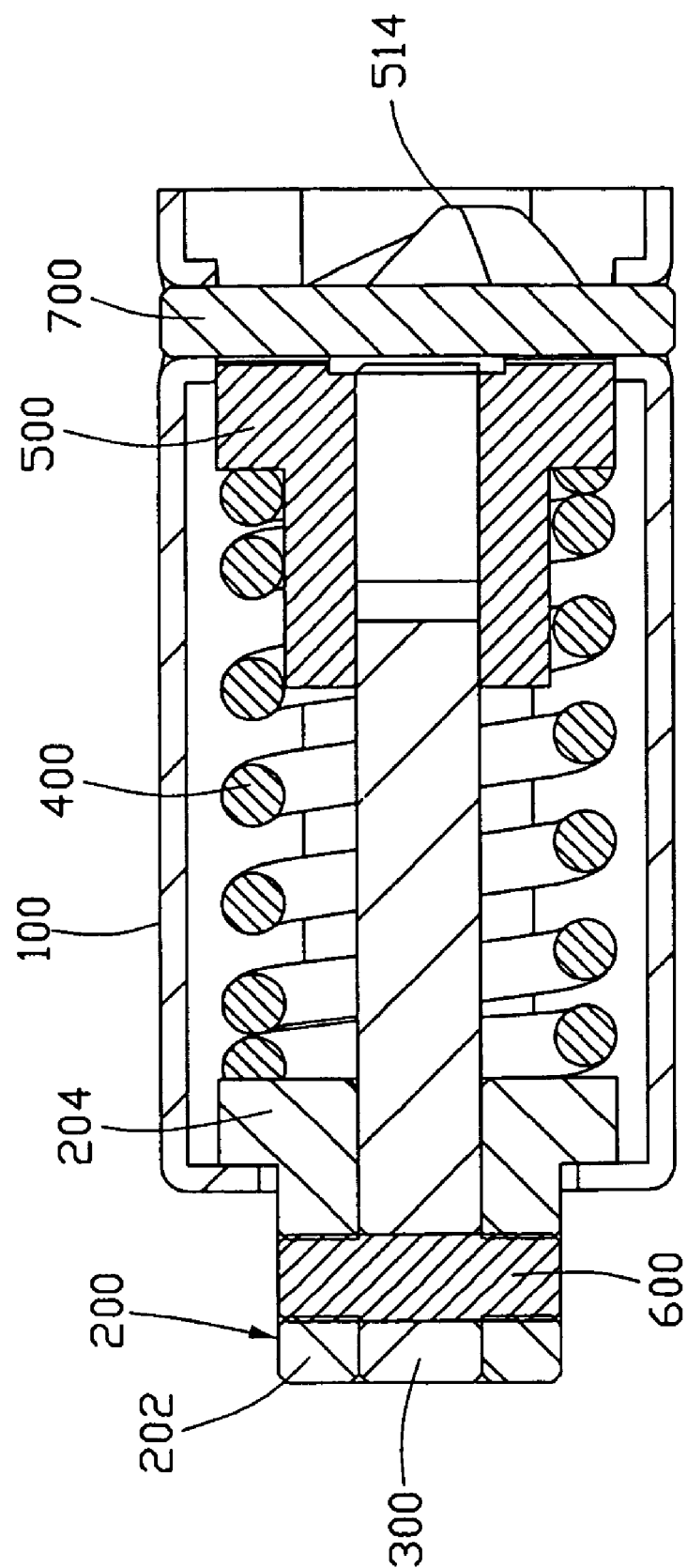
FIG. 4 is a cross-sectional view taken along line IV-IV of FIG. 3.
Figure 6:
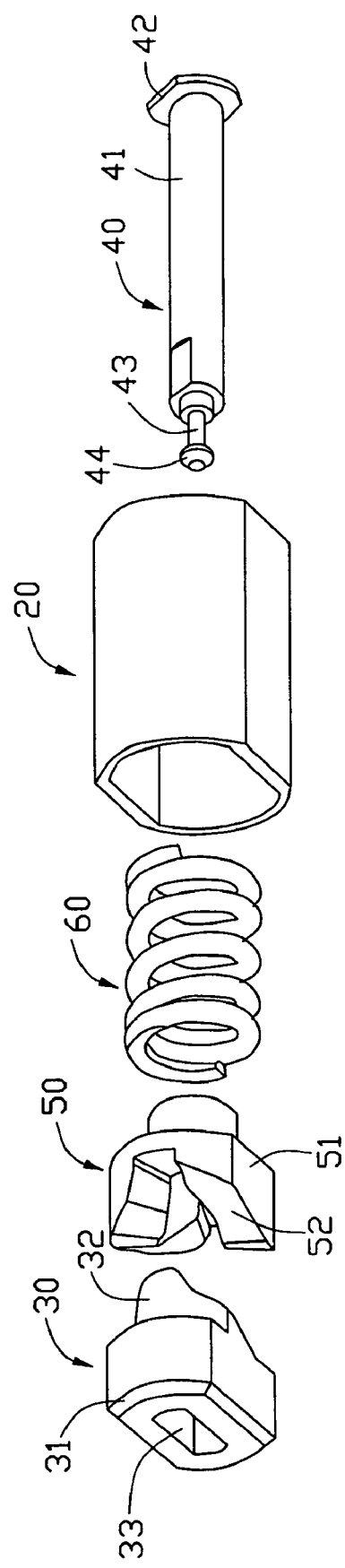
FIG. 6 is an exploded, isometric view of a conventional hinge assembly.

Referring to FIG. 6, when the cover of the foldable electronic device is rotated between an open position and a closed position, or vice versa, the housing 100 rotates along with the cover, while the shaft 300 remains fixed in the main body of the foldable electronic device. The follower 700 rotates along with the housing 100. As a result, the follower 700 rides along the steep inclined planes 516 of the cam surface 508 from the valleys 510 to the peaks 514 (see FIG. 4), with the cam 500 moving toward the spring 400 and compressing the spring 400. Once the follower 700 passes over the peaks 514, the spring 400 decompresses and drives the cam 500 back toward the follower 700, with the follower 700 riding along the moderate inclined planes 518 from the peaks 514 to the valleys 510. The cover is thus opened automatically to a fully open position or closed position under the decompression force of the spring 400. Accordingly, the cover is moved 180 degrees relative to the main body, with the follower 700 once again engaging with the valleys 510. In this way, the cover is closed or opened. Preferably, the structures of the cover and the main body are adapted to control the degree of rotation of the hinge assembly, such that the follower 700 can be held in one or more particular locations between the valleys 510 and the peaks 514.

In an alternative embodiment, the fixed member 200 may be integrally formed with the shaft 300. In this case, the securing portion 202 of the fixed member 200 is replaced by a fixing portion disposed on one end of the shaft 300. The fixing portion is integrally formed with the shaft 300, and the stopper portion with a larger diameter than the fixing portion and the shaft 300 is disposed adjacent the fixing portion. The stopper portion abuts the rear wall 102 of the housing 100 and is constrained by the rear wall 102 of the housing 100 from moving out of the housing 100 through the central hole 104. The fixing portion extends out of the housing 100 through the central hole 104 and engages in a socket of the cover of the foldable electronic device. In another alternative embodiment, the notch 308 can be omitted. In yet another alternative embodiment, the shaft portion 502 of the fixed member 500 can be omitted.

In further alternative embodiments, the follower 700 can be melted in the pinholes 112 of the housing 100 so that the follower 700 is firmly engaged with the housing 100. The spring 400 can be replaced by another kind of elastic element or urging mechanism known in the art.

It is to be understood, however, that even though numerous characteristics and advantages of the present embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A hinge assembly for joining a cover to a main body of a foldable electronic device, the hinge assembly comprising:
   a hollow housing comprising an open end, and a hole in an opposite second end, a peripheral wall of the housing defining a pair of opposite pinholes adjacent to the open end;
   a shaft comprising a fixing portion extending out of the housing through the hole, and a stopper portion adjacent to the fixing portion;
   an urging mechanism received in the housing and located around the shaft, one end of the urging mechanism abutting the stopper portion of the shaft;
   a cam received in the housing, the cam defining a cam hole extending therethrough and comprising a cam portion, one end of the cam portion having a cam surface, the cam hole engagingly receiving the shaft, an opposite end of the urging mechanism biasing the cam; and
   a follower essentially in the shape of a cylinder and fixed in the pinholes of the housing, the follower being rotatable relative to the shaft and movably engaged with the cam surface.

2. The hinge assembly as claimed in claim 1, wherein the fixing portion is a generally cylindrical body but with at least one planar side, for fixing the shaft in the main body.

3. The hinge assembly as claimed in claim 1, wherein the shaft is a generally cylindrical body with two apposite arcuate sides and two opposite planar sides.

4. The hinge assembly as claimed in claim 1, wherein the housing is generally cylindrical but with at least one planar sidewall, for fixing the housing in the cover.

5. The hinge assembly as claimed in claim 1, wherein the cam further comprises a shaft portion integrally formed with the cam portion.

6. The hinge assembly as claimed in claim 1, wherein the urging mechanism is a helical spring.

7. The hinge assembly as claimed in claim 1, wherein the stopper portion comprises a first end abutting the opposite second end of the housing, and an opposite second end abutting said one end of the urging mechanism.

8. A hinge assembly for joining a cover to a main body of a foldable electronic device, the hinge assembly comprising:
   a hollow housing comprising an open first end, and a hole in an opposite second end;
   a fixed member comprising a securing portion extending out of the housing through the hole;
   a shaft securely connected with the fixed member;
   an elastic element received in the housing and located around the shaft;
   a cam received in the housing, the cam receiving the shaft therethrough such that the cam is linearly movable along the shaft and non-rotatable relative to the shaft, the cam comprising a cam portion, one end of the cam portion having a cam surface, one end of the elastic element biasing the cam; and
   a positioning member essentially in the shape of a cylinder, the positioning member being fixed to a peripheral wall of the housing adjacent to the open end of the housing and extending transversely across the housing, the positioning member being rotatable relative to the shaft and movably engaged with the cam surface.

9. The hinge assembly as claimed in claim 8, wherein the peripheral wall of the housing defines a pair of opposite pinholes adjacent to the open end of the housing, and the positioning member is fixed in the pinholes of the housing.

10. The hinge assembly as claimed in claim 8, wherein the cam defines a cam hole extending therethrough, and the cam hole engagingly receives the shaft therethrough.

11. The hinge assembly as claimed in claim 8, wherein the fixed member further comprises at least one pinhole extending transversely therethrough, the securing portion is a generally cylindrical body with at least one planar side configured for fixing of the fixed member in the main body, and the planar side defines a pinhole therethrough.

12. The hinge assembly as claimed in claim 11, wherein the shaft is a generally cylindrical body with two opposite arcuate sides and two opposite planar sides, and the shaft defines a through hole at one end thereof, the through hole spanning between the planar sides.

13. The hinge assembly as claimed in claim 12, further comprising a pin, the pin being securely engaged in the at least one pinhole of the fixed member and the through hole of the shaft.

14. The hinge assembly as claimed in claim 8, wherein the housing is generally cylindrical but with at least one planar sidewall configured for fixing of the housing in the cover.

15. The hinge assembly as claimed in claim 8, wherein the cam further comprises a shaft portion integrally formed with the cam portion.

16. The hinge assembly as claimed in claim 8, wherein the elastic element is a helical spring.

17. The hinge assembly as claimed in claim 8, wherein the fixed member further comprises a discoid head integrally formed with the securing portion, one end of the discoid head abuts the opposite second end of the housing, and an opposite end of the discoid head abuts an opposite end of the elastic element.

* * * * *